United States Patent Office 3,048,603
Patented Aug. 7, 1962

3,048,603
PURIFICATION OF 1-DEHYDRO-17α-METHYL-TESTOSTERONE CONTAMINATED BY SELENIUM
Alfred Hunger, Basel, Switzerland, and John Benjamin Ziegler, Summit, N.J., assignors to Ciba Corporation, a corporation of Delaware
No Drawing. Filed Dec. 3, 1959, Ser. No. 856,901
8 Claims. (Cl. 260—397.4)

The introduction of a 1,2-double bond into a Δ⁴-3-oxo-steroid by dehydrogenating the latter with selenium oxide (or selenious acid, of which selenium oxide is the anhydride) represents a very convenient one-step procedure for the preparation of the physiologically important $\Delta^{1,4}$-3-oxo-steroids. This method is more economical than the conventional halogenation and dehydrohalogenation or the microbiological dehydrogenation, which procedures generally involve more steps and/or the formation of undesired by-products.

It has been found that 17α-methyl-testosterone can be converted in high yield to 1-dehydro-17α-methyl-testosterone, a highly active anabolic agent known under the generic name "methandrostenolone," by treating the former with selenium oxide (or selenious acid) in the presence of a solvent or solvent mixture, such as, for example, a tertiary lower alkanol, e.g. tertiary amyl alcohol and the like, a lower alkane carboxylic acid, e.g. acetic acid and the like, or any other suitable solvent. Despite all the advantages of the dehydrogenation method of 17α-methyl-testosterone with selenium oxide (or selenious acid), the residual amounts of selenium, particularly of organically bound selenium, contaminating the resulting crude 1-dehydro-17α-methyl testosterone, represent a serious drawback of this dehydrogenation method. In view of its use as a therapeutical agent, the final product has to be virtually free from impurities, such as organically bound selenium, in order to comply with the required degree of purity. Although a major part of the selenium impurities in the crude product may be removed, for example, by filtration, adsorption and elution, recrystallization methods and the like, a certain amount of these undesired by-products still remain as contaminants and cannot be eliminated by the above-mentioned conventional methods. This amount is invariably in excess of the quantity of selenium tolerated in pharmaceutical compositions by health authorities.

We have now found a simple and economical process for the removal of selenium impurities contaminating 1-dehydro-17α-methyl-testosterone obtained by dehydrogenating 17α-methyl-testosterone with selenium oxide or selenious acid, which comprises treating the crude 1-dehydro-17α-methyl-testosterone with hydrogen peroxide, separating the resulting acidic fraction from the neutral fraction, treating the neutral fraction with an adsorbent, and recovering the purified 1-dehydro-17α-methyl-testosterone.

This procedure yields the desired 1-dehydro-17α-methyl-testosterone virtually free from contaminating selenium impurities. Surprisingly, the double bonds in the A-ring and/or the substituents attached to the 17-position of the 1-dehydro-17α-methyl-testosterone are not affected by the treatment with hydrogen peroxide, which is a strong oxidizing reagent; no degradation products are observed and the yields of pure material are excellent.

The crude 1-dehydro-17α-methyl-testosterone, which is obtained from the dehydrogenation of 17α-methyl-testosterone and is used as the starting material in the process of this invention, contains from about 1,000 to about 15,000 parts per million of organically bound selenium. Although a portion of this impurity may be removed by conventional methods, such as filtration of a solution of the crude product, adsorption on an adsorbent and subsequent elution, recrystallization and the like, such purification steps are not necessary prior to the process of the invention, and the crude material obtained from the dehydrogenation procedure can be used directly in the first step of the procedure of this invention.

Treatment with hydrogen peroxide (used, for example, in the form of an aqueous solution of about 30 percent strength) is preferably carried out at room temperature and in the presence of a solvent, such as, for example, an organic carboxylic acid, particularly a lower alkane carboxylic acid, e.g. acetic acid and the like, or any other suitable organic solvent, which does not participate in the reaction or is affected by hydrogen peroxide.

The acidic fractions in the resulting reaction product are removed, for example, by extracting a solution of the latter in an organic solvent, such as, for example, a hydrocarbon, particularly a monocyclic aryl hydrocarbon, e.g. toluene and the like, a lower alkyl lower alkanoate, e.g. ethyl acetate and the like, or any other suitable, inert solvent, with an alkaline reagent, particularly an aqueous alkaline reagent, such as, for example, aqueous alkali metal hydroxide, e.g. lithium, sodium or potassium hydroxide, aqueous alkali metal carbonate or hydrogen carbonate, e.g. lithium, sodium or potassium carbonate or hydrogen carbonate, aqueous ammonia or a mixture of different alkaline reagents. The solution of the reaction product in an organic solvent may be used directly in the next step.

The neutral fraction, preferably kept in solution with one of the solvents used in the previous step, such as, for example, toluene, ethyl acetate or any other suitable solvent, is then treated with an adsorbent. This treatment may be carried out, for example, by passing the solution through a column containing the adsorbent, or by adding the adsorbent to the solution and subsequently filtering off the solid material. Aluminum oxide (neutral or basically activated), silicagel, diatomaceous earth or any equivalent material may serve as an adsorbent. If necessary, the desired 1-dehydro-17α-methyl-testosterone is completely liberated from the adsorbent by washing the latter with an additional amount of solvent.

The purified 1-dehydro-17α-methyl-testosterone is then recovered according to known procedures, for example, by evaporating the solution after the treatment with the adsorbent and recrystallizing the residue from an appropriate solvent, for example, from ethyl acetate and the like.

With the purification procedure of the present invention, the content of organically bound selenium can be kept considerably below twenty five parts per million, for example, at from about five to about fifteen parts per million, which amounts are sufficient to satisfy the requirements of health authorities.

The following example illustrates the invention; temperatures are given in degrees centigrade.

*Example*

6.5 g. of 1-dehydro-17α-methyl-testosterone, which contains about 8,000 parts per million of organically bound selenium, is dissolved in 13 ml. of glacial acetic acid; 0.65 g. of 30 percent aqueous hydrogen peroxide is added and the reaction mixture is allowed to stand at room temperature for twenty hours. The reaction mixture is then diluted with 52 ml. of water, the precipitate is filtered off and thoroughly washed with water.

2.0 g. of the resulting product is dissolved in 20 ml. of toluene, and the organic solution is washed three times with 20 percent aqueous sodium carbonate to remove the acidic parts in the organic solution; the latter is dried over magnesium sulfate and passed through a column containing 6.0 g. of aluminum oxide (basic, 80 to 200 mesh). The column is washed with 200 ml. of toluene, the organic solvent is evaporated and the residue is crystallized from ethyl acetate to yield the purified 1-dehydro-17α-methyl-testosterone, M.P. 166–168°, containing 13 parts per million of selenium impurities.

The starting material may be prepared as follows: A solution of 50 g. of 17α-methyl-testosterone in 1,000 ml. of tertiary amyl alcohol and 25 ml. of acetic acid is treated with 18.4 g. of selenium oxide, by adding the latter in portions to the refluxing solution over a period of eight hours. Refluxing is continued for sixteen hours; the reaction mixture is then filtered and ethyl acetate is added to the filtrate. The organic solution is washed with a saturated aqueous sodium chloride solution and with a saturated sodium carbonate solution, dried over magnesium sulfate and evaporated under reduced pressure. The residue is crystallized from ethyl acetate to yield crude 1-dehydro-17α-methyl-testosterone containing about 8,000 parts per million of organically bound selenium.

What is claimed is:

1. Process for the removal of selenium impurities contaminating 1-dehydro-17α-methyl-testosterone obtained by dehydrating 17α-methyl-testosterone with a member of the group consisting of selenium oxide and selenious acid, which comprises treating a solution of the crude 1-dehydro-17α-methyl-testosterone in a lower alkane carboxylic acid with hydrogen peroxide, separating the resulting acidic fraction from the neutral fraction, treating said neutral fraction with an adsorbent, and recovering the purified 1-dehydro-17α-methyl-testosterone from the neutral fraction.

2. Process according to claim 1, wherein a solution of the crude 1-dehydro-17α-methyl-testosterone in acetic acid is used.

3. Process according to claim 1, wherein an aqueous solution of hydrogen peroxide of about 30 percent strength is used.

4. Process according to claim 1, wherein the treatment with hydrogen peroxide is carried out at room temperature.

5. Process according to claim 1, wherein the resulting acidic fraction is separated from the neutral fraction by extracting a solution of the reaction product in an organic solvent with an aqueous alkaline reagent.

6. Process according to claim 5, wherein the resulting acidic fraction is separated from the neutral fraction by extracting a solution of the reaction product in an organic solvent with aqueous sodium carbonate.

7. Process according to claim 1, wherein a solution of the neutral fraction is treated with aluminum oxide as an adsorbent.

8. Process according to claim 1, wherein the purified 1-dehydro-17α-methyl-testosterone is recovered from the neutral fraction by recrystallization.

References Cited in the file of this patent

Florey et al.: J.O.C., 22, 406–409 (1957).
Baran: J. Am. Chem. Soc., 80, 1687–1691 (1958).

UNITED STATES PATENT OFFICE
CERTIFICATE OF CORRECTION

Patent No. 3,048,603                                      August 7, 1962

Alfred Hunger et al.

It is hereby certified that error appears in the above numbered patent requiring correction and that the said Letters Patent should read as corrected below.

Column 4, line 25, for "recrystallization" read -- crystallization --.

Signed and sealed this 5th day of May 1964.

(SEAL)
Attest:

ERNEST W. SWIDER                                      EDWARD J. BRENNER

Attesting Officer                                                   Commissioner of Patents